(12) United States Patent
Waldstädt

(10) Patent No.: US 10,986,846 B2
(45) Date of Patent: Apr. 27, 2021

(54) INDEXING DEVICE

(71) Applicant: Poly-clip System GmbH & Co. KG, Hattersheim (DE)

(72) Inventor: Manfred Waldstädt, Mainz (DE)

(73) Assignee: Poly-clip System GmbH & Co. KG, Hattersheim (DE)

(*) Notice: Subject to any disclaimer, the term of this patent is extended or adjusted under 35 U.S.C. 154(b) by 0 days.

(21) Appl. No.: 16/860,854

(22) Filed: Apr. 28, 2020

(65) Prior Publication Data

US 2020/0337320 A1    Oct. 29, 2020

(30) Foreign Application Priority Data

Apr. 29, 2019    (EP) ..................................... 19171662

(51) Int. Cl.
*B65G 47/61*    (2006.01)
*B65G 47/60*    (2006.01)
(Continued)

(52) U.S. Cl.
CPC ............ *A22C 15/002* (2013.01); *B65G 17/38* (2013.01); *B65G 47/61* (2013.01); *B65G 2201/0202* (2013.01)

(58) Field of Classification Search
CPC ................................ B65G 47/61; B65G 47/60
(Continued)

(56) References Cited

U.S. PATENT DOCUMENTS 4,880,105 A * 11/1989 Kasai ...................... A22C 11/00
                                                                198/465.4
5,163,964 A * 11/1992 Lazzeri .................. A61F 2/3609
                                                                623/23.21

(Continued)

FOREIGN PATENT DOCUMENTS

| DE | 3437830 A1 | 4/1986 |
|----|------------|--------|
| EP | 2156743 A1 | 2/2010 |
| EP | 2977339 A1 | 1/2016 |

OTHER PUBLICATIONS

EPO; Application No. 19171662.0; Extended European Search Report dated Oct. 17, 2019.

*Primary Examiner* — Douglas A Hess
(74) *Attorney, Agent, or Firm* — Fitch, Even, Tabin & Flannery LLP

(57) ABSTRACT

The present invention relates to a transfer arrangement for transferring sausage-shaped products, like sausages, to a rod-like element, like a smoking rod, provided in a loading position in a hanging line, each of the sausage-shaped products contain a flowable filling material in a tubular or bag-shaped packaging casing provided with a suspension element, like a suspension loop, through which the sausage-shaped products can be suspended on the rod-like element. The transfer arrangement comprises an infeed device having an infeed conveyor and a guide bar along which the suspension elements of the sausage-shaped products are guided in an infeed direction to the rod-like element, a transport device which is arranged above the rod-like element and the guide bar and which has a conveyor device with transportation elements for transporting the sausage-shaped products along the guide bar towards the rod-like element, and a drive device for driving the conveyor device, and an indexing device for supporting the guide bar. The indexing device includes at least two pairs of indexing pins configured to be reversibly moved pairwise and alternately into an engagement position for engaging with the guide bar for supporting the guide bar and into a release position for disengaging with the guide bar for allowing the passage of a suspension element of a sausage-shaped product to be suspended on the rod-like element in the loading position, wherein the indexing pins of each pair of indexing pins are arranged on opposite sides of the guide bar and at least substantially opposite to each other, and a transmission arrangement for driving and controlling the movement of the indexing pins. The transmission arrangement is driven by the transport device.

15 Claims, 5 Drawing Sheets

(51) Int. Cl.
*A22C 15/00* (2006.01)
*B65G 17/38* (2006.01)

(58) Field of Classification Search
USPC .............. 198/657, 678.1, 680, 685, 684
See application file for complete search history.

(56) References Cited

U.S. PATENT DOCUMENTS

| | | | | |
|---|---|---|---|---|
| 5,197,915 | A * | 3/1993 | Nakamura | A22C 15/001 226/104 |
| 5,354,230 | A * | 10/1994 | McFarlane | A22C 15/001 211/113 |
| 5,755,022 | A * | 5/1998 | Whittlesey | A22C 11/127 29/243.56 |
| 6,287,189 | B1 * | 9/2001 | Moro | A22C 11/006 452/49 |
| 6,494,311 | B2 * | 12/2002 | Muller | A22C 11/00 198/606 |
| 6,786,321 | B2 * | 9/2004 | Borkiewicz | A22C 15/001 198/419.3 |
| 7,249,997 | B2 * | 7/2007 | Kasai | A22C 11/00 452/51 |
| 8,430,726 | B2 * | 4/2013 | Topfer | B65G 47/61 452/51 |
| 8,540,555 | B2 * | 9/2013 | Reitz | A22C 11/125 452/46 |
| 8,696,415 | B2 * | 4/2014 | Topfer | A22C 15/002 452/51 |
| 8,747,192 | B2 * | 6/2014 | Sames | B65G 47/61 452/51 |

* cited by examiner

US 10,986,846 B2

INDEXING DEVICE

CROSS-REFERENCE TO RELATED APPLICATION

The present application claims the benefit of priority of European Patent Application No. 19171662.0 filed on Apr. 29, 2019, the contents of which are incorporated herein by reference in their entirety.

FIELD OF THE INVENTION

The present invention relates to a transfer arrangement for transferring sausage-shaped products, like sausages, to a rod-like element, like a smoking rod, provided in a loading position of a hanging line, each of the sausage-shaped products contain a flowable filling material in a tubular or bag-shaped packaging casing provided with a suspension element, like a suspension loop, through which the sausage-shaped products can be suspended on the rod-like element by means of their suspension elements. The transfer arrangement comprises an infeed device having an infeed conveyor and a guide bar along which the suspension elements of the sausage-shaped products are guided in an infeed direction to the rod-like element, a transport device which is arranged above the rod-like element and at least partially above the guide bar, and which has a conveyor device with transportation elements for transporting the sausage-shaped products along the guide bar towards the rod-like element, a drive device for driving the conveyor device. Moreover, an indexing device for supporting the guide bar can be provided wherein the indexing device includes at least two pairs of indexing pins configured to be reversibly moved pairwise and alternately into an engagement position for engaging with the guide bar for supporting the guide bar and into a release position for disengaging with the guide bar for allowing the passage of a suspension element of a sausage-shaped product to be suspended on the rod-like element in the loading position, wherein the indexing pins of each pair of indexing pins are arranged on opposite sides of the guide bar and at least substantially opposite to each other.

BACKGROUND OF THE INVENTION

In the production of sausage-shaped products, like sausages, a filling material is fed by a filling machine through a filling tube of the clipping machine into a tubular casing material stored on said filling tube. After a predetermined volume of filling material has been filled into said tubular casing material, the clipping machine closes the rear end of the sausage-shaped product via closing means, like closure clips, which are attached by respective closing tools. A suspension element, like a suspension loop, may also be attached to said rear end of said sausage-shaped product, enabling the sausage-shaped product to be hung up or suspended e.g. on a smoking rod or the like. Afterwards, the sausage-shaped product just produced is separated from the remaining casing material by a cutting device of the clipping machine and is transferred or discharged out of the clipping machine to a handling device for the next treatment step or a storage device by a respective discharge device.

For suspending the sausage-shaped product on a smoking rod provided in a loading position of a hanging line, the suspension element is grabbed or picked up by a transport device which removes the sausage-shaped product from a take-up position formed for example by an infeed device, and which may include a conveyor chain having suspension hooks. The sausage-shaped product, while hanging on the suspension hook, is than guided with its suspension element over the smoking rod and placed on a desired storage place on the smoking rod. When the smoking rod in the loading position is completely loaded, it is moved out of the loading position and an empty smoking rod is placed to be filled next.

From DE patent application 34 37 830, a device for suspending sausages on a smoking rod is known. The sausages provided with suspension loops are transported by means of their suspension loops along a sword and onto a conveyor chain. The smoking rod embraces the lower run of the conveyor chain and is rotated about its longitudinal axis for transferring the suspension loops from the conveyor chain onto the smoking rod. The sword is supported by pairs of bolts which can reversibly come into engagement with holes in the sword by piston/cylinder drives and which may successively be retracted by said piston/cylinder drives for enabling passage of the suspension loops of the sausages.

A further known hanging line for suspending sausages is disclosed in EP patent application 1 891 859. The sausages which are produced in a known clipping machine include a suspension loop that is guided along a sword towards a smoking rod. A chain conveyor is partially arranged above the sword and engages the loops by means of hooks arranged at the conveyor chain such that the respective sausage hangs on said hook by its loop. The sword is supported by bolts coming reversibly into engagement with respective holes in the side surfaces of said sword. Additionally, for transporting the sausages along the sword, chain conveyors with latches are provided which engage respective grooves in the side surfaces of the sword. By driving the conveyor chains, the latches move the sausages by their loops along the sword.

In these known hanging lines, several drives are provided for moving the various components of the hanging line, particularly, the different chain drives for the conveyor chains, the discharge conveyors or the bolts for supporting the sword. A mismatch between these components would lead to an incorrect transfer of the sausage-shaped products onto the rod-like element, or to production losses by sausage-shaped products falling off from one of the components of these hanging lines. Accordingly, an increased control effort is necessary to guarantee a correct synchronisation of the various components of these known hanging lines.

Thus, it is an object of the present invention to overcome the above-mentioned drawbacks, and to provide a transfer arrangement for transferring sausage-shaped products to a rod-like element that is operable with a reduced control amount.

SUMMARY OF THE INVENTION

According to the present invention, there is provided a transfer arrangement for transferring sausage-shaped products, like sausages, to a rod-like element, like a smoking rod, provided in a loading position of a hanging line, each of the sausage-shaped products contain a flowable filling material in a tubular or bag-shaped packaging casing provided with a suspension element, like a suspension loop, through which the sausage-shaped products can be suspended on the rod-like element. The transfer arrangement comprises an infeed device having an infeed conveyor and a guide bar along which the suspension elements of the sausage-shaped products are guided in an infeed direction to the rod-like element, a transport device which is arranged above the rod-like element and at least partially above the guide bar, and which has a conveyor device with transportation elements for transporting the sausage-shaped products along the guide bar towards the rod-like element, and a drive device for driving the conveyor device, and an indexing device for supporting the guide bar. The indexing device includes at least two pairs of indexing pins configured to be reversibly moved pairwise and alternately into an engagement position, for engaging with the guide bar for supporting the guide bar, and into a release position for disengaging with the guide bar for allowing the passage of a suspension element of a sausage-shaped product to be stored on the rod-like element in the loading position, wherein the indexing pins of each pair of indexing pins are arranged on opposite sides of the guide bar and at least substantially opposite to each other, and a transmission arrangement for driving and controlling the movement of the indexing pins. The transmission arrangement is driven by the transport device.

The pairs of indexing pins can be alternately engaged and disengaged in pairs with the guide bar. The alternate engagement and disengagement of the pairs of indexing pins ensures that the suspension elements of the sausage-shaped products pass the guide bar without being affected by the indexing pins. Additionally, the guide bar is securely supported by the indexing pins of the indexing device. Furthermore, by driving the indexing device by the transport device, it is ensured that each sausage-shaped product provided in the infeed device is securely transferred to the rod-like element, by a synchronized operation of the transport device and the infeed device.

The transmission of the driving force from the transport device to the infeed device or to the pairs of indexing pins can be done in different ways. In a preferred configuration, a rotatory movement of the drive device of the transport device is transferred into a linear movement of the indexing pins, if necessary with interposition of a gearbox.

In a preferred embodiment of the inventive transfer arrangement, the transmission assembly includes two identical transmission assemblies for driving the pins of each pair of indexing pins, respectively. An identical design of the transmission assemblies reduces the number of different machine elements, and further allows identical control methods which reduce the control amount.

In a further preferred embodiment, each transmission assembly includes two L-shaped levers, each acting on one of the indexing pins, and coupled to actuation levers by coupling rods, and two cam discs each with a cam groove engaged by a cam roller of the actuation levers. The mechanical cooperation of the transmission elements reduces the number of drive elements, and thus, the control amount. In addition, this design allows reliable and safe operation over a long service life of the machine.

Advantageously, the cam discs of the transmission assemblies are arranged on a common axle which not only allows a synchronized movement of the cam discs, but also a synchronized movement of the indexing pins.

The shape of the cam grooves controls the movement of the actuation levers via which the indexing pins are moved. Further advantageously, the cam grooves of the cam discs have a circular groove with at least one cam lobe. The circular movement enables the actuation levers to remain in their position, whereas the at least one cam lobe causes a pivot movement of the actuation levers.

A single cam lobe in the cam groove causes the actuation lever to pivot one time per rotation of the cam disc. Dependent on the transportation speed of the transfer arrangement, two or more cam lobes may be provided in the cam groove to allow more suspension elements to pass the indexing device, and thus, a higher transportation speed of the transport device is possible.

For enabling a continuous operation of the transfer arrangement, it is further preferred that the two or more lobes are arranged in regular angular positions.

In a preferred configuration, the angular position of the one or more cam lobes corresponds to the distance between two subsequent transportation elements on the conveyor device. Thereby, the suspension element of each sausage-shaped product engaged by a transportation element may pass the guide bar without being affected by the indexing pins.

For further reducing the control amount as well as the number of drive elements, the indexing pins are preloaded in the release position, e.g. by an elastic element, like a spring. Furthermore, the indexing pins need only to be pushed into the engagement position, and automatically move into the release position.

The conveyor device of the transport device may be realized in different ways, like a band conveyor. In a further preferred configuration, the conveyor device has a conveyor element formed by two conveyor chains arranged parallel to each other and wound about two pairs of deflection rollers.

For securely engaging the suspension elements of the sausage-shaped products, the transportation elements attached to the conveyor element in regular intervals are provided with hooks.

For synchronizing the movement of the cam discs and the transport device, the cam discs and a first pair of deflection rollers are arranged on a common axle.

In an advantage design, the cam roller of an actuation lever is arranged at least approximately centrally on said actuation lever, with one end of the actuation lever forming a pivot point, and the other end being coupled to a coupling rod. The actuation levers are thereby divided into two lever portions. Dependent on the position of the cam rollers, the length of the moving path of the end of the actuation lever connected to the L-shaped levers may be adjusted.

For supporting the guide bar at the infeed conveyor, a connecting element is arranged between the infeed conveyor and the guide bar, which has the shape of a segment of a circle, at least at its upper surface facing towards the transport device.

In order to securely engage the suspension elements by the transportation elements, the axle on which the first deflection rollers of the transport device are arranged coincides with the centre of the circle segment formed by the upper surface of the connecting element.

In order to enable a complete loading of the rod-like elements, the first deflection rollers of the conveyor device of the transport device are arranged above the upstream end of the guide bar and the second deflection roller are arranged above and downstream the downstream end of the rod-like element in the loading position.

Further advantages and preferred embodiments of the present invention will be described in the following together with the drawings listed below. The expressions "left", "right", "below" and "above" used in the following description, are referred to the drawings in an alignment such that the reference numbers and the notation of the figures used can be read in normal orientation.

DETAILED DESCRIPTION

Figure 1:
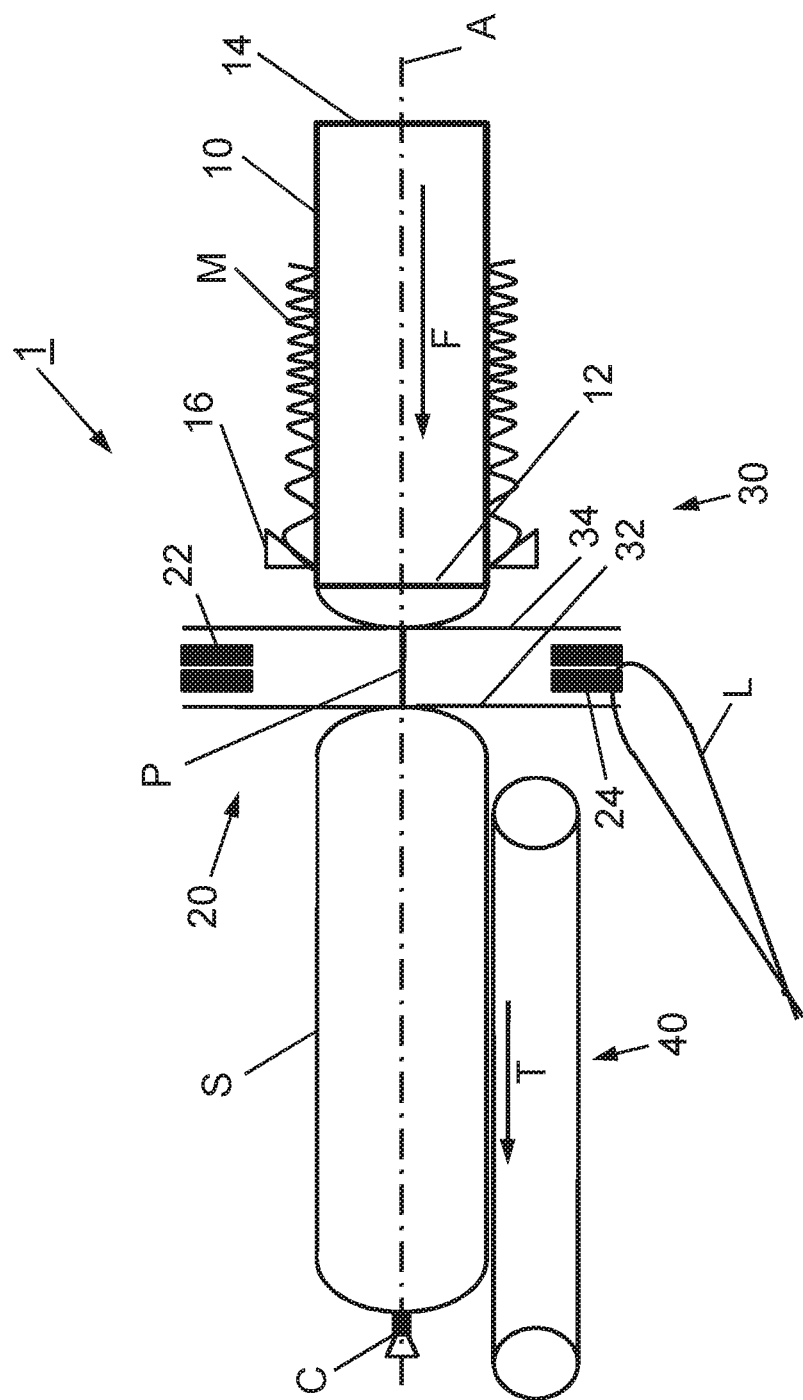
FIG. 1: is a schematic view showing the principal design of a clipping machine for producing sausage-shaped products.

A clipping machine 1 for producing sausage-shaped products S, like sausages, which contain a flowable filling material in a tubular or bag-shaped packaging casing M, is shown schematically in FIG. 1, in particular its closing region. Clipping machine 1 comprises filling tube 10 having a longitudinally and horizontally extending central axis A, with a discharge opening for discharging the filling material at its left end 12 and a feeding opening for feeding the filling material in a feeding direction F to the discharge opening of filling tube 10, for example by a feeding pump (not shown), at its right end 14. Moreover, a casing brake assembly 16 is arranged on and coaxially with filling tube 10 in the region of the left end 12 of filling tube 10. Filling tube 10 is made of a suitable material, like stainless steel.

A supply of tubular packaging casing M made of a thin sheet material is stored on filling tube 10 in a folded manner like a concertina. From the supply of tubular packaging casing M, tubular packaging casing M is pulled-off during the process of producing the sausage-shaped products S, in particular by the feeding pressure for filling the filling material into tubular packaging casing M wherein casing brake assembly 16 provides a braking force for allowing a controlled pulling-off of tubular packaging casing M during the filling process.

Clipping machine 1 further comprises a clipping device 20 for closing a filled tubular packaging casing M by applying closure means, like closure clips or closing clips C, to a plait-like portion P, and gathering means 30 for gathering the filled tubular packaging casing M and forming said plait-like portion P thereto. These components are all arranged downstream filling tube 10.

As can be inferred from FIG. 1, clipping device 20 is positioned immediately downstream left end 12 of filling tube 10, and coaxially aligned to filling tube 10. Clipping device 20 comprises a first and a second clipping tool 22, 24 formed by a punch 22 and a die 24. It has to be noted that punch 22 and die 24 may apply and close a single closure clip C for closing the just filled tubular packaging casing M, or may apply and close two closure clips C at the same time, a first closure clip C for closing the rear end of the just filled tubular packaging casing M for forming a sausage-shaped product S, and a second closure clip C for closing the front end of a tubular packaging casing M subsequently to be filled.

Gathering means 30 include a first displacer unit 32 and a second displacer unit 34, wherein first displacer unit 32 is positioned downstream second displacer unit 34. First and second clipping tools 22, 24 of clipping device 20 may be positioned between first and second displacer units 32, 34, at least for applying and closing one or two closure clips C to plait-like portion P. First displacer unit 32 can reversibly be moved parallel to feeding direction F of the filling material.

If it is intended to store the sausage-shaped products S on a rod-like element, like a smoking rod, e.g. for further processing like cooking or smoking, a suspension element L, like a suspension loop, may be provided and attached to one end of each of the sausage-shaped products S, or at one end of a chain of sausage-shaped products. Suspension element L may be fed to one of closing tools 22, 24, and may be fixed to the respective end of sausage-shaped product S by means of closure clip C which closes said end of sausage-shaped product S.

For discharging a sausage-shaped product S just produced from clipping machine 1 in a transportation direction T being at least substantially the same as feeding direction F, a discharge device 40 is arranged downstream clipping device 20, which may be a belt conveyor comprising a conveyor belt and guide rollers. In a simple case, discharge device 40 may be a chute.

For storing sausage-shaped products S on a rod-like element, suspension element L is caught by a catching device, like a catching needle, which guides suspension element L towards the rod-like element.

Figure 2:
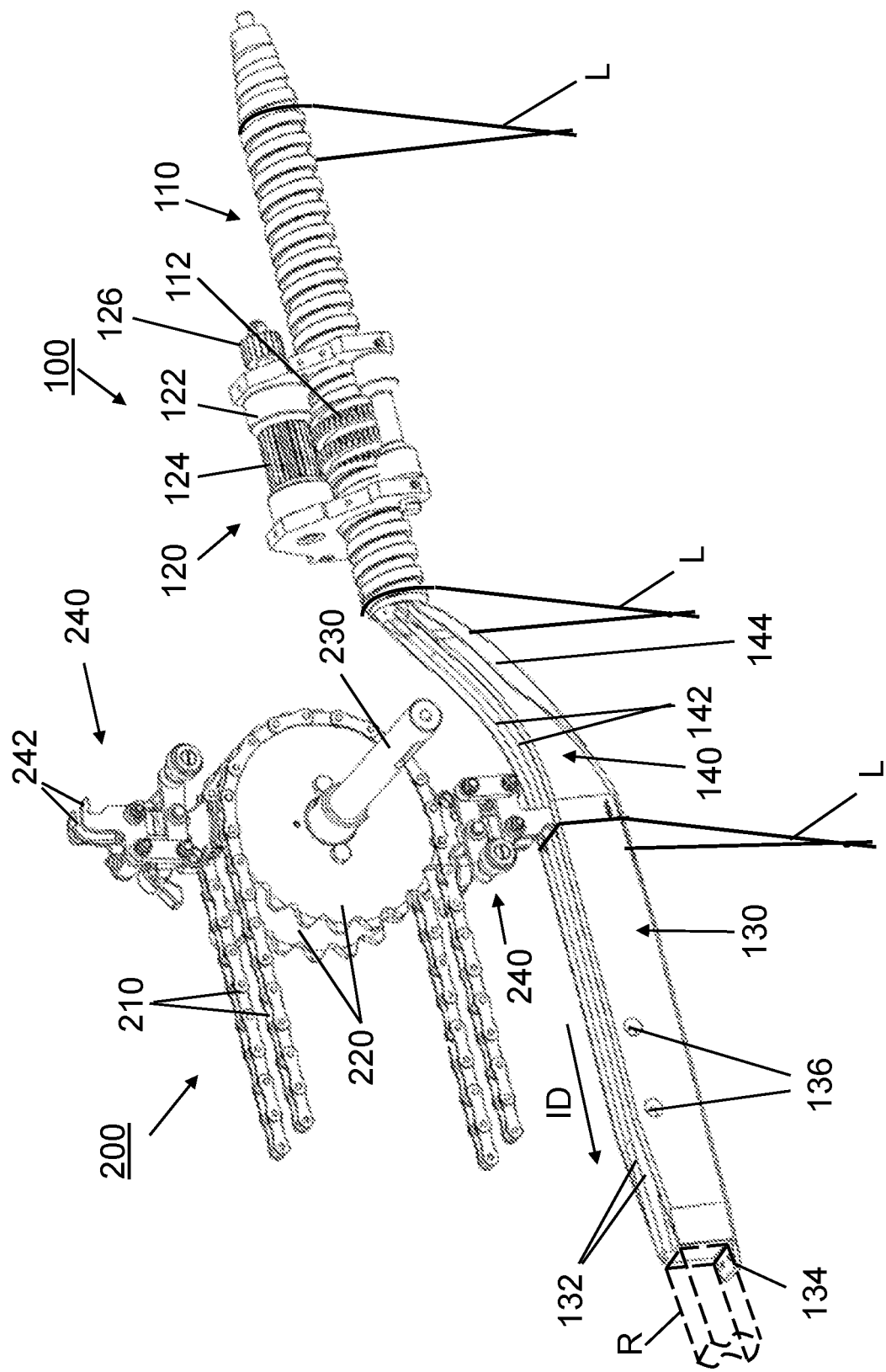
FIG. 2: is a perspective view to an infeed device which may be used in a transfer arrangement according to the present invention.

For suspending a sausage-shaped product S on a rod-like element, said sausage-shaped product S is carried out of clipping machine 1 and fed to a hanging line by an infeed device of a transfer arrangement TA (cf. FIG. 3), like infeed device 100 shown in FIG. 2. In FIGS. 2 to 5, only the upstream end of the hanging line is partially shown.

Infeed device 100 includes an infeed conveyor in the form a spindle 110 with a screw thread on its outer surface, that is supported by a spindle bearing 120, a guide bar 130 and a connecting element 140 connecting the downstream end of screwed spindle 110 with the upstream end of guide bar 130. Connecting element 140 has the shape of a segment of a circle, at least at its upper surface. The upstream end of connecting element 140 has an approximately circular cross-section adapted to the cross-section of screwed spindle 110, to allow a sliding transfer of a suspension element L from screwed spindle 110 onto connecting element 140.

The downstream end of connecting element 140 has an at least approximately rectangular shape adapted to the cross-sectional shape of guide bar 130. In the upper surface of connecting element 140, two parallel grooves 142 are arranged, which extend in an infeed direction ID. Also in the upper surface of guide bar 130, two parallel grooves 132 are arranged which extend in infeed direction ID, and which are aligned with grooves 142 in connecting element 140.

A portion of the surface of screwed spindle 110 has a toothed surface 112 which is engaged by a toothed portion 124 of a support roller 122 of spindle bearing 120.

At a free end of support roller 122, a toothed wheel 126 is arranged, via which support roller 122 may be rotated, for driving screwed spindle 110 at a desired speed.

For supporting guide bar 130, holes 136 are provided in both side surfaces of guide bar 130, i.e. in the surfaces of guide bar 130 extending at least approximately vertical, into which indexing pins 402, 404, 502, 504 (cf. FIGS. 3-5) come reversibly into engagement. At the upstream end, guide bar 130 is fixedly coupled to connecting element 140. The upstream end of connecting element 140 is radially supported by screwed spindle 110. Connecting element 140 has an engaging element, like a pin, at its upstream end that extends into the downstream end of spindle 110, in which it is rotatably supported in a roller bearing for enabling a rotational movement of screwed spindle 110 relative to connecting element 140. Pairs of oppositely arranged indexing pins 402, 404, 502, 504 which engage reversibly holes 136 in guide bar 130 provide radial and rotational support for guide bar 130, and enable passage of suspension elements S along guide bar 130, by pairwise alternatingly engaging and disengaging holes 136 in guide bar 130 (as it will be explained in detail in conjunction with FIGS. 3 to 5).

Figure 5:
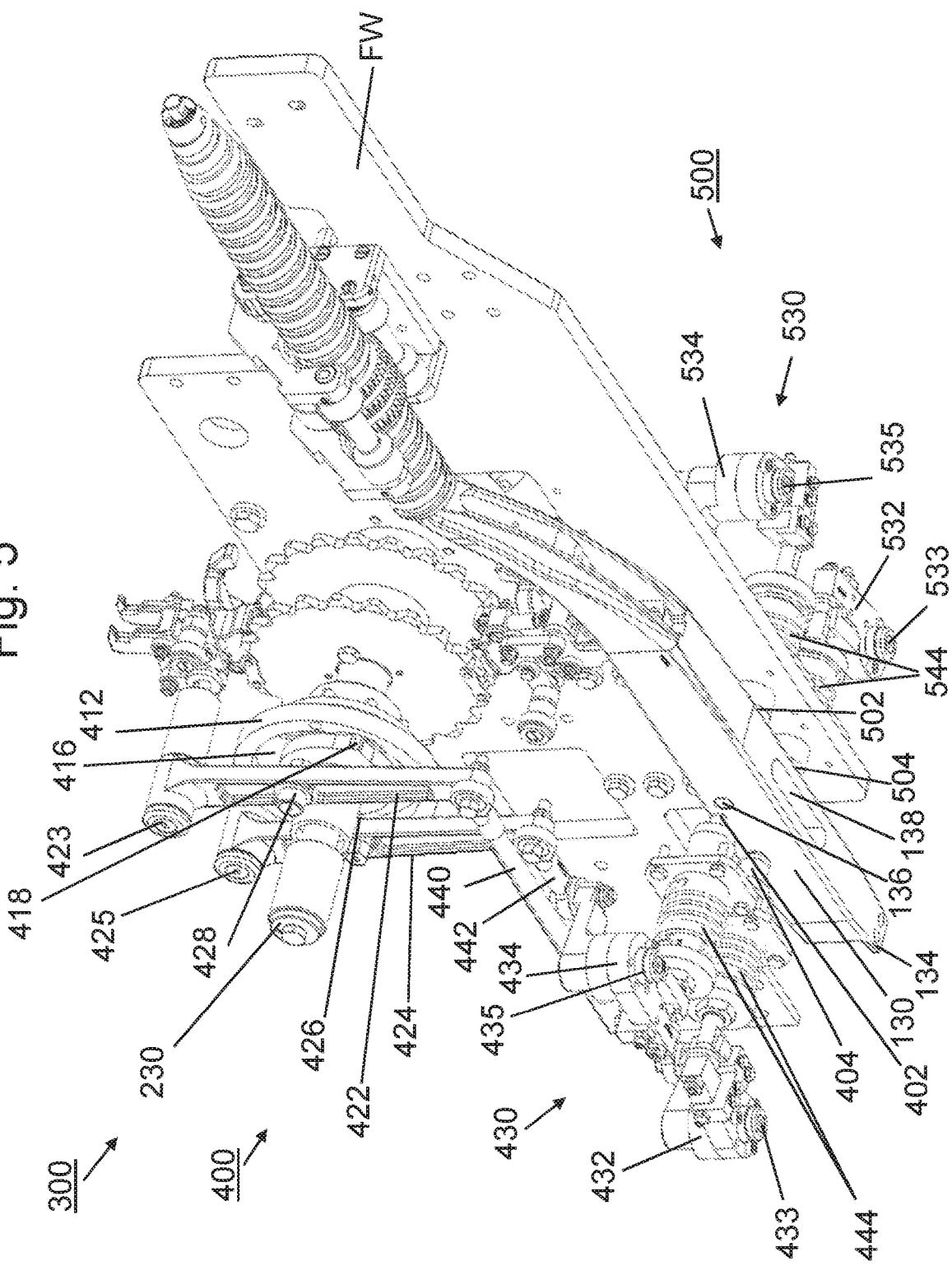
FIG. 5: is a perspective view from below to the transfer arrangement of FIG. 4.

As particularly can be seen in FIG. 5, a longitudinal blind hole 138 extends into guide bar 130 at its underside. Blind hole 138 reaches from the underside of guide bar 130 up to holes 136 into which indexing pins 402, 404, 502, 504 engage. In infeed direction ID, blind hole 138 extends between upstream holes 136 and downstream holes 136, such that wear and debris inserted into holes 136 by indexing pins 402, 404, 502, 504, may fall through blind hole 138 downwardly out of guide bar 130, for preventing clogging of holes 136.

Figure 3:
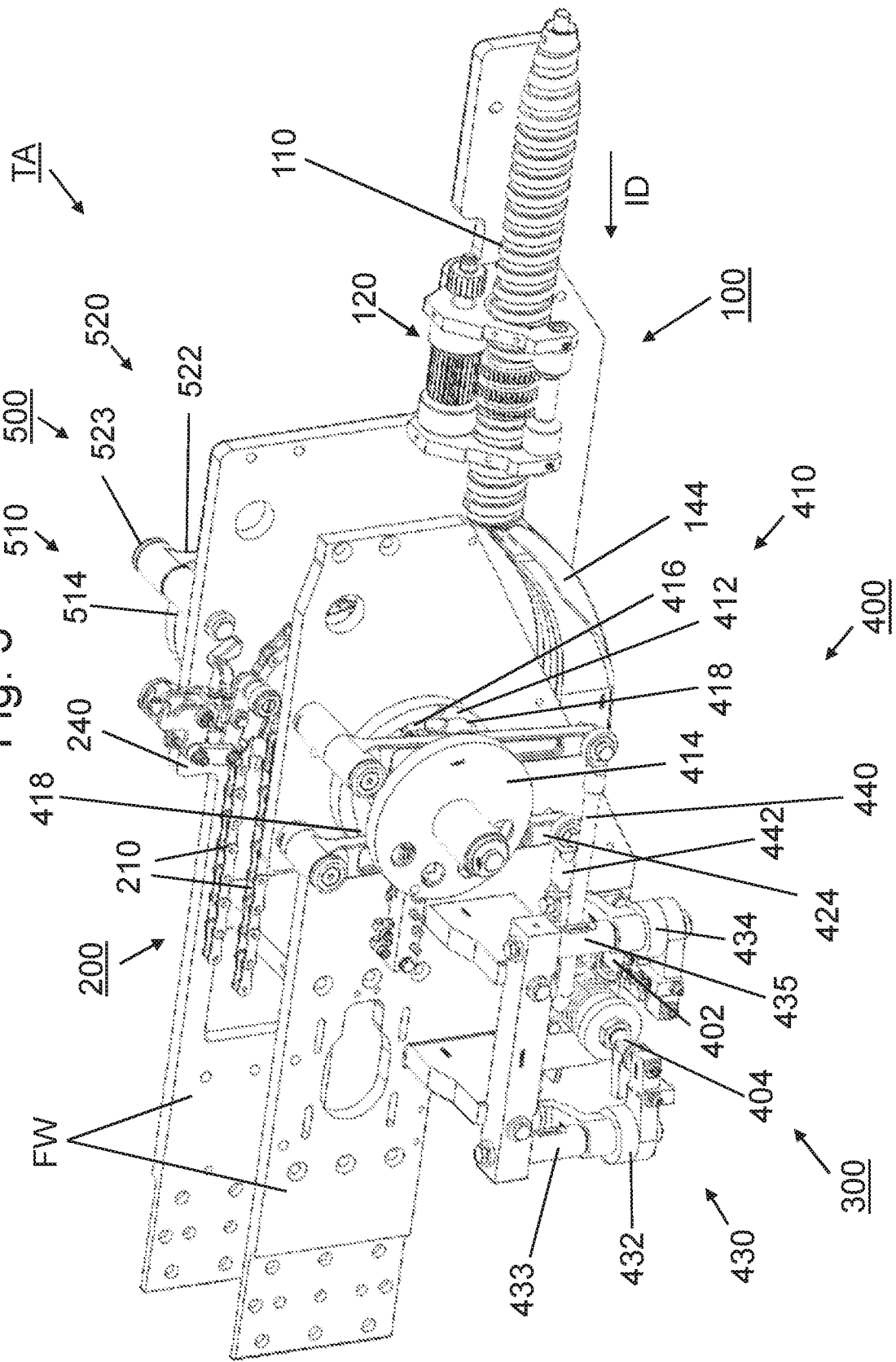
FIG. 3: is a perspective view to a transfer arrangement according to the present invention.

Longitudinal edges 144 of connecting element 140, which extend along its lower surface, are cut away, as can be seen in FIGS. 2 and 3, particularly, in the region of the upstream end of connecting element 140. These cutaways reduce the cross-sectional area in a vertical plane perpendicularly arranged to the longitudinal axis of screwed spindle 110. The reduction of the cross-sectional area prevents suspension elements L sliding from screwed spindle 110 along connecting element 140 towards guide bar 130 from sticking in this region of connecting element 140. As further can be seen in FIGS. 2, 4 and 5, at its downstream end, a support element 134 extends from guide bar 130, for supporting a rod-like element to be loaded with sausage-shaped products S. A suspension element L guided along guide bar 130 may thereby be transferred onto said rod-like element.

In FIG. 2, only suspension elements L are shown, representing the sausage-shaped products S to be transported along infeed device 100.

Transfer arrangement TA includes an infeed device 100 as explained in conjunction with FIG. 2, a transport device 200 for transporting the sausage-shaped products S fed by infeed device 100 along the rod-like element and placing said sausage-shaped products S thereon, and an indexing device 300 for supporting guide bar 130 of infeed device 100 and for allowing a suspension element L of a sausage-shaped product S to pass guide bar 130. Transfer arrangement TA further comprises a framework FW with two parallel plates, for supporting the components of transfer arrangement TA. The plates of framework FW are arranged parallel to each other with infeed device 100 and transport device 200 therebetween.

Vertically above guide bar 130 of infeed device 100, transport device 200 is arranged, and extends in infeed direction ID (cf. FIG. 2). Transport device 200 is embodied as a chain conveyor having two endless conveyor chains 210 which are arranged parallel to each other, and with each conveyor chain 210 being wound about a first and a second deflection roller. In FIGS. 2 to 5, only first deflection rollers 220 are shown, which are arranged on a common axle 230. First deflection rollers 220 form the upstream end of horizontally arranged transport device 200. The (not shown) downstream end of transport device 200 is of identical constitution, and includes two second deflection rollers about which conveyor chains 210 are wound, and which are arranged on a common axle 230.

Transport device 200, and particularly conveyor chains 210 are driven by one of its common axles 230 of deflection rollers 220. Transport device 200 is driven such that the lower run of conveyor chains 210 moves in infeed direction ID.

Transportation elements 240 are arranged in regular intervals on conveyor chains 210. Each transportation element 240 includes a pair of hooks 242, with each hook 242 engaging one of grooves 132, 142 of guide bar 130 and connecting element 140 for engaging a suspension element L of a sausage-shaped product S to be suspended on a rod-like element.

In FIG. 2, the leftmost suspension element L is in the region of the take-up position at the upstream end of guide bar 130. For clarification matter only, the middle suspension element L is shown in a position at the downstream end of screwed spindle 110, where, by further rotation of screwed spindle 110, said suspension element L will be transferred onto connecting element 140, and further slide along connecting element 140 by gravity, into the take-up position to be picked up by the subsequent transportation element 240 which, in FIG. 2, is positioned vertically above common axle 230. With the leftmost suspension element L in the take-up position, middle suspension element L has a distance to the downstream end of spindle 110, such that said middle suspension element L is transferred onto connecting element 140 immediately before subsequent transportation element 240 passes the upstream end of connecting element 140.

The length of transport device 200 is selected such that the lower run of conveyor chains 210 extends at least from the upstream end of guide bar 130 up to the downstream end of the rod-like element to be loaded with sausage-shaped products S. Furthermore, in order to ensure a safe pick-up of a suspension element L by a transportation element 240, the central axis of axle 230 coincides with the centre of the circle segment formed by the upper surface of connecting element 140.

Indexing device 300 has identical but mirror-inverted indexing assemblies 400, 500, each arranged at one outer surface of the plates of framework FW. Identical elements and components of indexing assemblies 400, 500 are provided with identical reference signs, but increased by 100 for indexing assembly 500.

Indexing assemblies 400, 500 include two pairs of indexing pins 402, 502; 404, 504, which alternately in pairs engage and disengage holes 136 in guide bar 130, for supporting guide bar 130 and for enabling the passage of suspension elements L of sausage-shaped products S to be transferred onto a rod-like element. Indexing pins 402, 502, and indexing pins 404, 504 respectively, form each a pair of indexing pins 402, 502; 404, 504 and are arranged on opposite sides of guide bar 130, but they are coaxially aligned.

Each indexing assembly 400, 500 of indexing device 300 further comprises a cam-drive mechanism 410, 510, with inner cam discs 412, 512 and outer cam discs 414, 514, with inner cam discs 412, 512 arranged close to the respective outer surface of the plates of framework FW, and on common axle 230 of transport device 200. Outer cam discs 414, 514 are also arranged on common axle 230 of transport device 200, and with a distance to inner cam discs 412, 512.

Each cam disc 412, 414, 512, 514 is provided with a cam groove 416, 516 having an approximately rectangular cross-section and an approximately circular shape, and which are arranged coaxially with the centre of respective cam disc 412, 414, 512, 514. Each cam groove 416, 516 has two cam lobes 418, 518, which are arranged in cam grooves 416, 516 with an angle of 180° to each other, and which face radially outwardly. Cam grooves 416, 516 are of identical shape.

Cam-drive mechanisms 410, 510 further comprise lever devices 420, 520 for converting the rotational movement of cam discs 412, 414, 512, 514 into a linear movement.

Lever devices 420, 520 include first levers 422, 522 and second levers 424, 524, which are pivotally attached by their upper ends to the plate of framework FW, such that levers 422, 424, 522, 524 extend approximately downwardly and through the gap between outer and inner cam discs 412, 414; 512, 514 of cam-drive mechanisms 410, 510. The upper ends of levers 422, 424, 522, 524 are pivotally attached to the plates of framework FW by approximately horizontally arranged pivot axles 423, 425, 523, 525. In their central region, levers 422, 424, 522, 524 are provided with cam rollers 426, 428, 526, 528 which extend parallel to common axle 230 of transport device 200. Cam rollers 426, 526 of levers 424, 524 extend toward inner discs 412, 512 and engage cam grooves 416, 516 in said inner cam discs 412, 512. Cam rollers 428, 528 of levers 422, 522 extend outwardly toward outer discs 414, 514 and engage cam grooves 416, 516 in said outer cam discs 414, 514.

Indexing assemblies 400, 500 further comprise pin drive mechanisms 430, 530 for reversibly moving indexing pins 402, 502; 404, 504 between an engagement position, in which indexing pins 402, 502; 404, 504 pairwise alternately engage holes 136 in guide bar 130, for supporting guide bar 130, and a release position, in which indexing pins 402, 502; 404, 504 are pairwise alternately out of engagement with holes 136, for enabling a suspension element L to pass guide bar 130.

Figure 4:
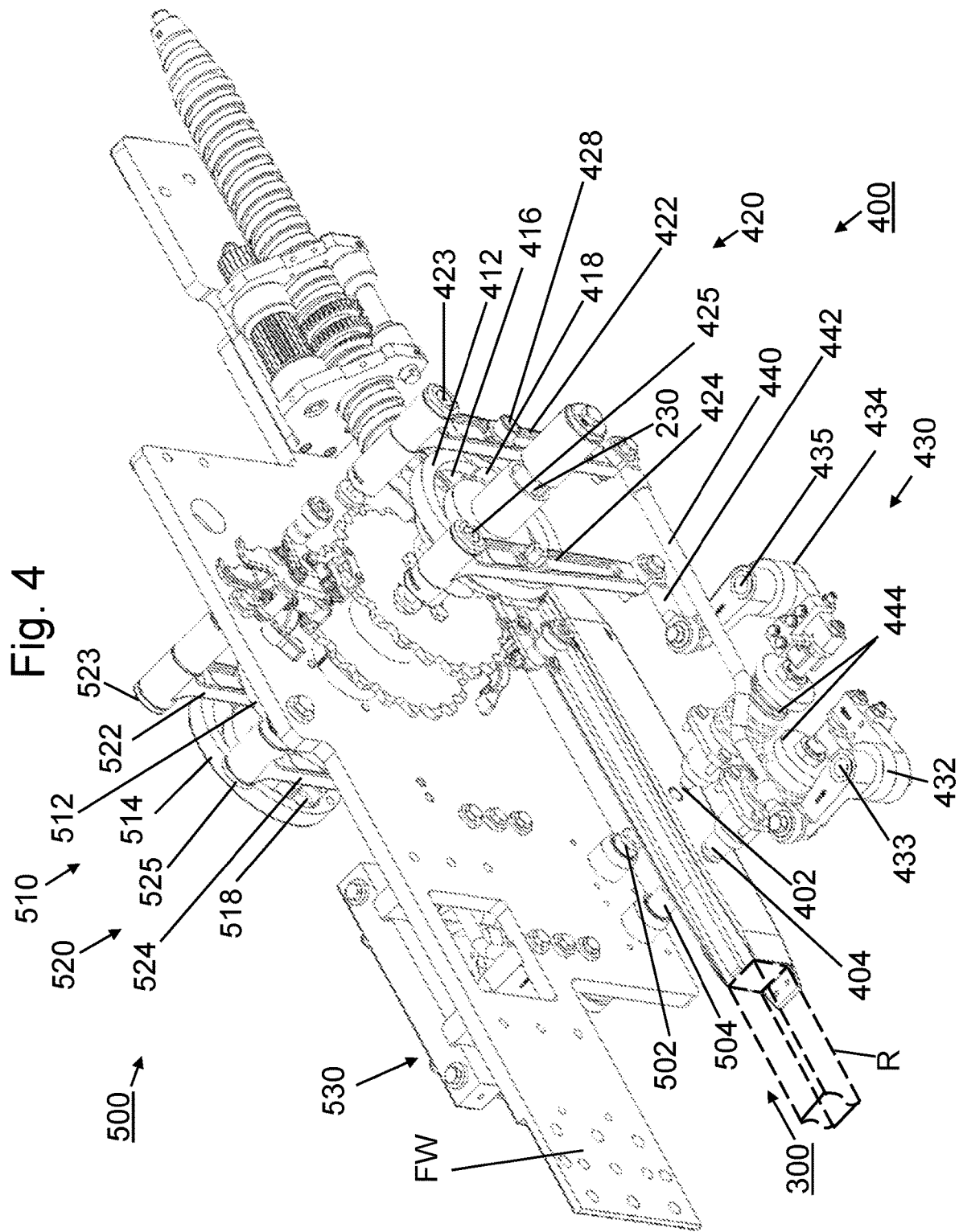
FIG. 4: is a perspective view to the transfer arrangement of FIG. 3, in which some elements have been left.

As can be seen in FIGS. 3 to 5, pin drive mechanisms 430, 530 comprise angled levers 432, 434, 532, 534, which are horizontally arranged, and which are pivotally mounted to a vertical pivot axle 433, 435, 533, 535. Angled levers 432, 434, 532, 534 have first lever arms and second lever arms, which at least approximately together form an "L", with the pivot point between the first and second lever arms. The first lever arm of angled levers 432, 434, 532, 534 is arranged approximately parallel to guide bar 130, whereas the respective second lever arm extends approximately parallel to indexing pins 402, 502; 404, 504. Furthermore, the first lever arms of each pair of angled levers 432, 434; 532, 534 are directed to each other.

The free ends of the first lever arms of angled levers 432, 434, 532, 534 are in contact with the ends of indexing pins 402, 502; 404, 504, which face away from guide bar 130. The free ends of the second lever arms of angled levers 432, 434, 532, 534 are coupled to the free ends of levers 422, 424, 522, 524 of cam-drive mechanisms 410, 510, via coupling rods 440, 442; 540, 542.

Cam drive devices 410, 510, pin drive devices 430, 530 and coupling rods 440, 442; 540, 542 form the transmission assemblies of the transmission arrangement for driving and controlling the movement of indexing pins 402, 502; 404, 504.

As further can be seen in FIGS. 3 to 5, indexing pins 402, 502; 404, 504 are preloaded by coiled springs 444, 544, which are supported by the plates of framework FW and which act on the rear ends of indexing pins 402, 502; 404, 504.

For transferring a sausage-shaped product S along transfer arrangement TA, suspension element L is caught and transferred onto screwed spindle 110 of infeed device 100. While driving spindle 110, a sausage-shaped product S is transported along spindle 110. At the downstream end of spindle 110, suspension element L of sausage-shaped product S is transferred onto connecting element 140 and slides along connecting element 140 towards the upstream end of guide bar 130.

Conveyor chains 210 of transport device 200 are driven in infeed direction ID such that suspension element L is engaged by hooks 242 of transportation element 240 and transported along guide element 130 towards a rod-like element arranged in a loading position downstream guide bar 130 and with its upstream end supported by supporting element 134 of guide bar 130.

Cam discs 412, 414, 512, 514 are arranged on common axle 230 of transport device 200. Thus, together with transport device 200, also cam discs 412, 414; 512, 514 are driven, namely, rotated about common axle 230.

For transferring a sausage-shaped product S from infeed device 100 to a rod-shaped element, said sausage-shaped product S, suspended by its suspension element L, is transported along spindle 110 of infeed device 100 and transferred via connecting element 140 onto guide bar 100. In the take-up position (cf. FIG. 2), the suspension element L is picked up by hooks 242 of transportation element 240 of transport device 200, and transported along guide bar 100 to its storage place on a rod-like element arranged downstream guide bar 100. Transport device 200 is driven by a drive device. Together with transport device 200, indexing device 300 is driven, which is coupled with common axle 230 of drive transport device 200. Thereby, a synchronized operation of transport device 200 and indexing device 300 is realized.

The principle function of indexing device 300 will now exemplarily be described by describing the function of indexing assembly 400. Indexing assembly 500 functions in identical manner. While driving transport device 200 in infeed direction ID, cam discs 412, 414, like first deflection rollers 220 of transport device 200, rotate clockwise too. As long as cam rollers 426, 428 of levers 422, 424 are positioned in the circular portions of cam grooves 416, indexing pins 402, 404 are in the engagement position, in which they engage holes 136 in guide bar 120 for supporting guide bar 130.

Cam discs 412, 414 are arranged mirror-inverted on common axle 230, such that the grooved surfaces face each other. Cam grooves 416 have a circular shape with each groove 416 provided with two cam lobes 418, which are arranged with an angle of 180° between each other. Cam lobes 418 face radially outwardly.

During rotation of cam discs 412, 414, cam rollers 426, 428 engage in one of cam lobes 418, whereby actuation levers 422, 424 are pivoted about pivot axles 423, 425. Thereby levers 422, 424 are moved away from common axle 230. During this movement, lever 424, via connecting rod 442, pushes the free end of the second arm of L-shaped or angled lever 434 in infeed direction ID, whereby the free end of the first arm of angled lever 434 is moved away from indexing pin 402, which, driven by spring 444, comes out of engagement with guide bar 130.

In the same manner, during engagement of cam roller 428 in one of cam lobes 418, lever 422, via connecting rod 440, pulls at the free end of the second arm of L-shaped or angled lever 432, whereby the free end of the first arm of angled lever 432 is moved away from indexing pin 404, which comes out of engagement with guide bar 130.

Cam discs 412, 414 on common axle 230 are displaced about a rotational angle which is selected such that indexing pins 402, 404 subsequently disengage holes 136 in guide bar 120, such that at first, indexing pin 402 disengages from guide bar 120, for allowing the passage of a suspension element L, thereafter indexing pin 402 engages guide bar 120. The angular displacement of cam discs 412, 414 further ensures that, immediately after indexing pin 402 is in engagement with guide bar 120, indexing pin 404 is disengaged from guide bar 120 for allowing passage of said suspension element L, and for engaging guide bar 130 after suspension element L has passed indexing pin 404.

Indexing pins 502, 504 of indexing assembly 500 are controlled by cam discs 512, 514 in an identical manner. Moreover, cam discs 512, 154 are arranged such that indexing pins 402, 502; 404, 504 pairwise engage and disengage guide bar 130, fur securely supporting guide bar 130 and for securely allowing a suspension element L to subsequently pass the pairs of indexing pins 402, 502; 404, 504. In other words, indexing pins 402, 502 disengage from guide bar 130 for allowing the passage of a suspension element L and engage guide bar 130 after the passage of said suspension element L. Immediately after indexing pins 402, 502 are in engagement with guide bar 130, indexing pins 404, 504 are brought out of engagement with guide bar 130 such that the suspension element L can pass indexing pins 404, 504 which than go back into engagement with guide bar 130.

Thereby, guide bar 130 is securely supported by the pairs of indexing pins 402, 502; 404, 504, and a safe passage of suspension element L is enabled.

It has further to be noted that, since indexing device 300 is driven by transport device 200, the transport of sausage-shaped products along guide bar 130 and the movement of indexing pins 402, 404, 502, 504 is synchronized.

Additionally, as can be seen in FIGS. 3 to 5, cam grooves 416, 516 are provided with two cam lobes 418, 518. Accordingly, by one complete revolution of cam discs 412, 414, 512, 514, indexing pins 402, 404, 502, 504 disengage from guide bar 120 for two times, whereby two suspension elements L may pass indexing pins 402, 404, 502, 504.

Furthermore, as particularly can be seen in FIG. 2, transportation elements 240 are arranged in regular intervals on conveyor chains 210, such that the angular displacement of transportation elements 240 relative to common axle 230, when passing first deflection rollers 220, is 180°. Thus, during one complete revolution of first deflection rollers 220, which corresponds with one complete revolution of cam discs 412, 414, 512, 514, two transportation elements 240, which transport two sausage-shaped products S along guide bar 130, may pass the pick-up position, and thus, also two suspension elements L carried by two subsequent transportation elements 240, may pass indexing pins 402, 404, 502, 504. It has further to be noted that this adjustment between transport device 200 and indexing device 300 is independent from the transportation speed, since an increased transportation speed causes a corresponding increased actuation of indexing pins 402, 404, 502, 504.

It has further to be noted that the number of lobes in the cam groove is not limited to two lobes. The cam groove may be provided with any number of lobes, like only one, three or more lobes. It is essential for the functionality of transfer arrangement TA that the lobes are arranged in regular intervals, and that the angular displacement of the lobes corresponds with the distance of the transportation elements of the transport device.

According to the embodiment of indexing device 300 shown in FIGS. 3 to 5, actuation levers 422, 424, 522, 524 are approximately vertically arranged and are pivotally attached by their upper ends to framework FW, and their lower ends act via coupling rods 440, 442, 540, 542 on indexing pins 402, 404, 502, 504. Dependent on the particular design of the cam drive, actuation levers may have any suitable orientation, like a horizontal orientation. Naturally, it is also possible that the lower ends of actuation levers 422, 424, 522, 524 are pivotally attached to framework FW, and that their upper ends act on indexing pins 402, 404, 502, 504.

Independent from the specific design of transfer arrangement TA as particularly described in conjunction with FIGS. 3 to 5, it is the general idea of the present invention to synchronize the movement of a transport device for transporting sausage-shaped products by their suspension elements and an indexing device which allows the passage of the suspension elements of said sausage-shaped products along a guide bar, and which together form a transfer arrangement.

According to the present invention, the synchronisation is realized by using one drive device for driving the transport device, and coupling the indexing device with the drive device such that the movement of the indexing device is derived from the drive device.

In the embodiment shown in FIGS. 3 to 5, the indexing device includes a cam drive device including cam discs and levers for reversibly moving the indexing pins. In order to realize a synchronized movement of the drive device and the indexing pins, the movement of the drive device may be transmitted to the indexing pins by other than the shown cam drive device. The rotational movement of the common axle of the drive device may be transmitted to a cam shaft as a central part of the transmission arrangement, and that directly or indirectly acts onto the indexing pins.

Further alternatively, a crank mechanism which includes one or more crank drives, may be provided as the transmission arrangement for transmitting the movement of the drive device to the indexing pins.

What is claimed is:

1. A transfer arrangement for transferring sausage-shaped products, to a rod-like element, provided in a loading position of a hanging line, each of the sausage-shaped products contain a flowable filling material in a tubular or bag-shaped packaging casing provided with a suspension element, through which the sausage-shaped products can be suspended on the rod-like element, the transfer arrangement comprises:

an infeed device having an infeed conveyor and a guide bar along which the suspension elements of the sausage-shaped products are guided in an infeed direction to the rod-like element;

a transport device which is arranged above the rod-like element and the guide bar and which has a conveyor device with transportation elements for transporting the sausage-shaped products along the guide bar towards the rod-like element, and a drive device for driving the conveyor device;

an indexing device for supporting the guide bar, wherein the indexing device includes at least two pairs of indexing pins configured to be reversibly moved pairwise and alternately into an engagement position for engaging with the guide bar for supporting the guide bar and into a release position for disengaging with the guide bar for allowing the passage of a suspension element of a sausage-shaped product to be suspended on the rod-like element in the loading position, wherein the indexing pins of each pair of indexing pins are arranged on opposite sides of the guide bar and at least substantially opposite to each other; and a transmission arrangement for driving and controlling the movement of the indexing pins, wherein the transmission assembly is driven by the transport device.

2. The transfer arrangement according to claim 1, wherein the transmission arrangement includes two identical transmission assemblies for driving one of the pins of each pair of indexing pins.

3. The transfer arrangement according to claim 2, wherein each transmission assembly includes two L-shaped levers, each acting on one of the indexing pins, and coupled to actuation levers by coupling rods, and two cam discs each with a cam groove engaged by a cam roller of the actuation levers.

4. The transfer arrangement according to claim 3, wherein the cam discs of the transmission assemblies are arranged on a common axle.

5. The transfer arrangement according to claim 3, wherein the cam groove is a circular groove with at least one cam lobe.

6. The transfer arrangement according to claim 3, wherein the cam groove comprises two or more cam lobes.

7. The transfer arrangement according to claim 6, wherein the two or more lobes are arranged in regular angular positions.

8. The transfer arrangement according to claim 7, wherein angular position of the one or more cam lobes corresponds to the distance between two subsequent transportation elements on the conveyor device.

9. The transfer arrangement according to claim 3, wherein the conveyor device of the transport device has a conveyor element formed by two conveyor chains arranged parallel to each other and wound about two pairs of deflection rollers, and wherein the cam discs and a first pair of deflection rollers are arranged on a common axle.

10. The transfer arrangement according to claim 3, wherein the cam rollers are arranged at least approximately centrally on the actuation levers, with one end of the actuation lever forming a pivot point, and the other end being coupled to a coupling rod.

11. The transfer arrangement according to claim 1, wherein the indexing pins are preloaded in the release position.

12. The transfer arrangement according to claim 1, wherein the conveyor device of the transport device has a conveyor element formed by two conveyor chains arranged parallel to each other and wound about two pairs of deflection rollers.

13. The transfer arrangement according to claim 12, wherein the transportation elements attached to the conveyor element in regular intervals, are provided with hooks.

14. The transfer arrangement according to claim 1, wherein the infeed conveyor of the infeed device is a screwed spindle.

15. The transfer arrangement according to claim 1, wherein a connecting element is arranged between the infeed conveyor and the guide bar, and which has the shape of a segment of a circle.

* * * * *